(12) United States Patent
Kobayashi

(10) Patent No.: US 7,778,535 B2
(45) Date of Patent: Aug. 17, 2010

(54) SHAKE REDUCTION APPARATUS

(75) Inventor: Masahiro Kobayashi, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 321 days.

(21) Appl. No.: 12/069,111

(22) Filed: Feb. 7, 2008

(65) Prior Publication Data

US 2008/0198464 A1   Aug. 21, 2008

(30) Foreign Application Priority Data

Feb. 15, 2007   (JP) .............................. 2007-035041

(51) Int. Cl.
*G03B 17/00* (2006.01)
*G03B 27/64* (2006.01)
*H04N 5/228* (2006.01)

(52) U.S. Cl. ................ 396/55; 348/208.99; 348/208.7; 359/554

(58) Field of Classification Search .................. 396/55
See application file for complete search history.

(56) References Cited

U.S. PATENT DOCUMENTS

| 4,309,077 | A  | * | 1/1982  | Tomori ....................... 359/825 |
| 6,064,827 | A  | * | 5/2000  | Toyoda ........................ 396/55 |
| 7,440,687 | B2 | * | 10/2008 | Seo ............................. 396/55 |
| 7,639,933 | B2 | * | 12/2009 | Seo et al. ..................... 396/55 |
| 2002/0141075 | A1 | * | 10/2002 | Nagae ....................... 359/699 |
| 2005/0212917 | A1 | | 9/2005 | Kakiuchi ................. 348/208.2 |

FOREIGN PATENT DOCUMENTS

| JP | 6-67255 A    |   | 3/1994 |
| JP | 9-288289     | * | 4/1999 |
| JP | 2003-057706 A |  | 2/2003 |

OTHER PUBLICATIONS

Machine English translation of JP 09-288289, Nov. 4, 1997, 11 pages.*

* cited by examiner

*Primary Examiner*—Melissa J Koval
(74) *Attorney, Agent, or Firm*—Frishauf, Holtz, Goodman & Chick, P.C.

(57) ABSTRACT

A shake reduction apparatus comprising a movable-side unit having a movable-side frame provided with a camera unit including a lens and an image sensor, and a movable-side shaft having a spherical surface as an extremity surface thereof; a stationary-side unit having a stationary-side frame provided with a stationary-side shaft having an extremity formed as a spherical surface coming into contact with the extremity of the movable-side shaft, to which the movable-side unit is attached; linear actuators disposed between the movable-side frame and the stationary-side frame to drive the movable-side unit to rotate about two orthogonal axes; a movement detection unit for detecting a movement of a camera about the two orthogonal axes; and a controller for controlling the linear actuators to cause the movable-side unit to move so as to cancel the movement of the camera when the movement detection unit detects the movement of the camera.

10 Claims, 12 Drawing Sheets

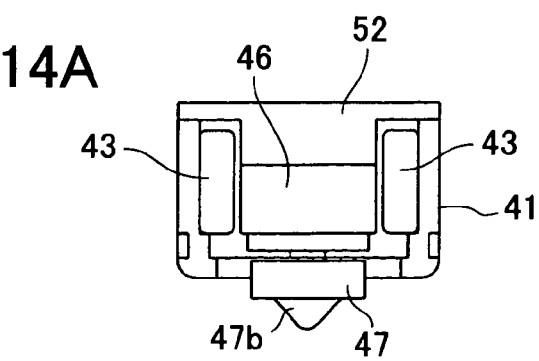
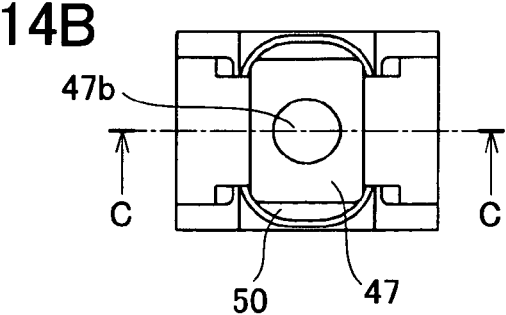
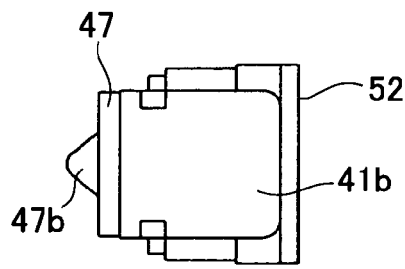
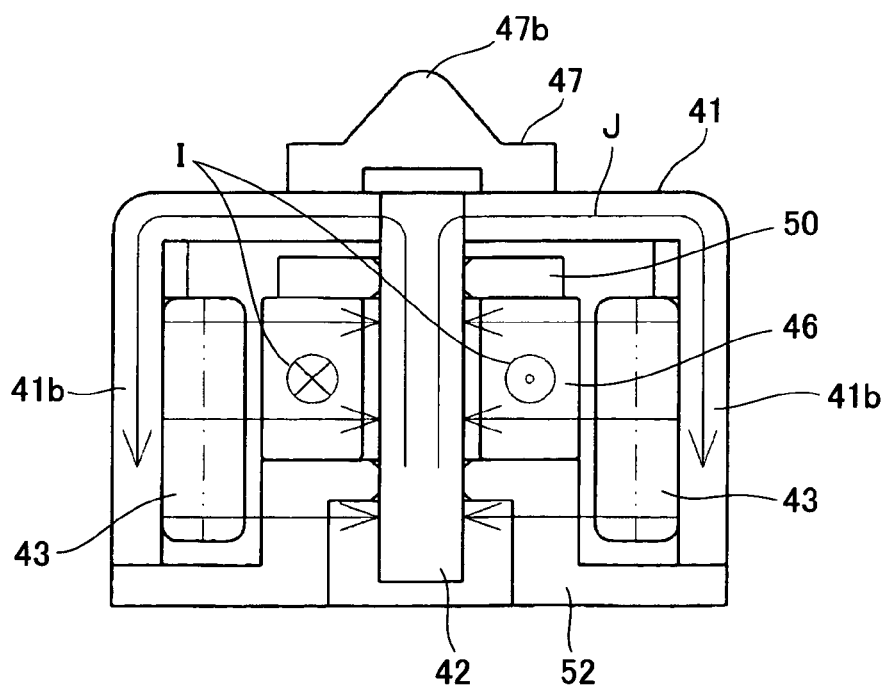

SHAKE REDUCTION APPARATUS

This application is based on and claims the benefit of priority from Japanese Patent Application No. 2007-035041, filed on 15 Feb. 2007, the content of which is incorporated herein by reference.

BACKGROUND OF THE INVENTION

1. Field of the Invention

The present invention relates to a shake reduction apparatus in a digital camera or the like.

2. Related Art

In general, blurring caused by hand shake on the occasion of taking a picture is a phenomenon which results from a situation where a camera moves over a period any time between an opened state of the aperture and a closed state thereof from the push of a release button, whereby the image becomes formed with the appearance of blur. A technique of lens-shift shake reduction and a technique of sensor-shift shake reduction have conventionally been used to mitigate such a blurring caused by hand shake.

The abovementioned lens-shift shake reduction techniques, however, has a problem in that the design for compensation of an optical axis is difficult since a lens is made to move for modifying the optical axis. In addition, the moving of a lens causes some problems of aberration, etc. and becomes a cause of optical deterioration of an image. On the other hand, in the abovementioned sensor-shift shake reduction, the position with respect to the optical system is changed by moving the image sensor, thereby exerting adverse influences such as backlash upon the machine accuracy.

Furthermore, in any correction systems, there is the necessity of a sensor for detecting movement of a camera body and sensors for use in detecting movement of a lens and an image sensor, so that its control is complex and a large number of sensors are required, resulting in difficulty in reducing the size of the camera. Additionally, if a structure of a lens and an image sensor is changed, there is the necessity to also change the moving distances of the lens and image sensor. Thus, customization has to be done each time such a specification is changed, and the problem lies in that efficiency of mass production is low.

It is an object of the present invention to provide a shake reduction apparatus which can prevent any optical deterioration and adverse influence on machine accuracy when correcting the blurring induced by hand shake, and which easily controls the correction and can be reduced in size.

SUMMARY OF THE INVENTION

The present invention proposes a shake reduction apparatus, comprising: a movable-side unit having a movable-side frame provided with a camera unit including a lens and an image sensor, and a movable-side shaft having a spherical surface as an extremity surface thereof; a stationary-side unit having a stationary-side frame provided with a stationary-side shaft having an extremity formed as a spherical surface coming into contact with the extremity of the movable-side shaft, to which the movable-side unit is attached; linear actuators disposed between the movable-side frame and the stationary-side frame to drive the movable-side unit to rotate about two orthogonal axes; a movement detection unit for detecting a movement of a camera about the two orthogonal axes; and a controller for controlling the linear actuators to cause the movable-side unit to move so as to cancel the movement of the camera when the movement detection unit detects the movement of the camera.

BRIEF DESCRIPTION OF THE DRAWINGS

FIGS. 14A, 14B and 14C are a front view, a bottom view, and a right side view of the modification of the linear actuator applicable to the present invention, respectively;

FIG. 15 is a cross-sectional view showing a relation between a magnetic field and a current in the modification of the linear actuator applicable to the present invention.

DETAILED DESCRIPTION OF THE INVENTION

Now, a plurality of embodiments of the present invention are described in more detail with reference to the drawings. It should be noted that constituent elements in the present embodiment can be replaced by the existing constituent elements or the like as appropriate, and involve different variations including combinations with the other existing constituent elements. Therefore, the description of the present embodiments is never intended to limit content of the invention defined in claims.

First Embodiment

Figure 1:
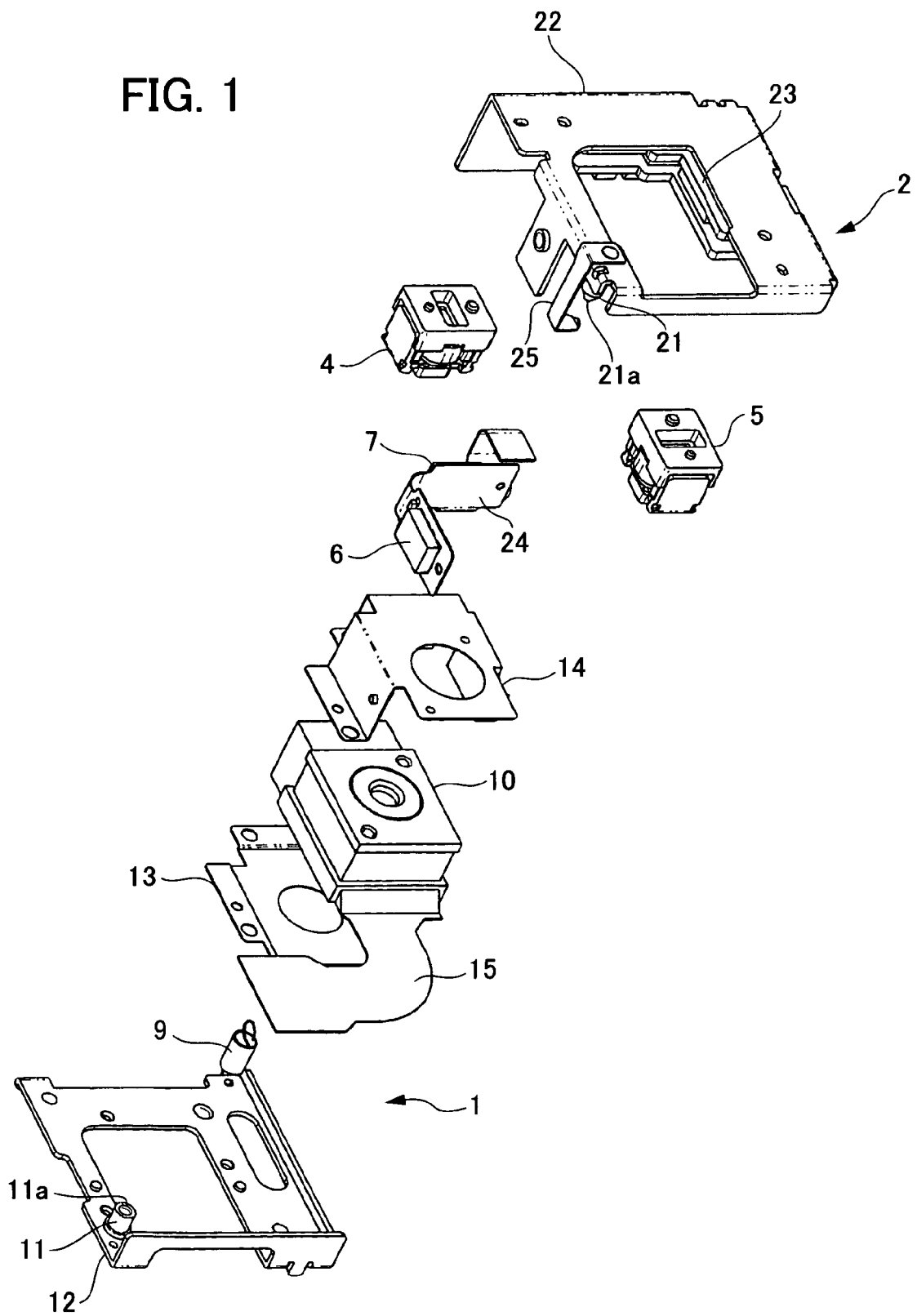
FIG. 1 is an exploded perspective view showing a first embodiment of a shake reduction apparatus according to the present invention.
Figure 2:
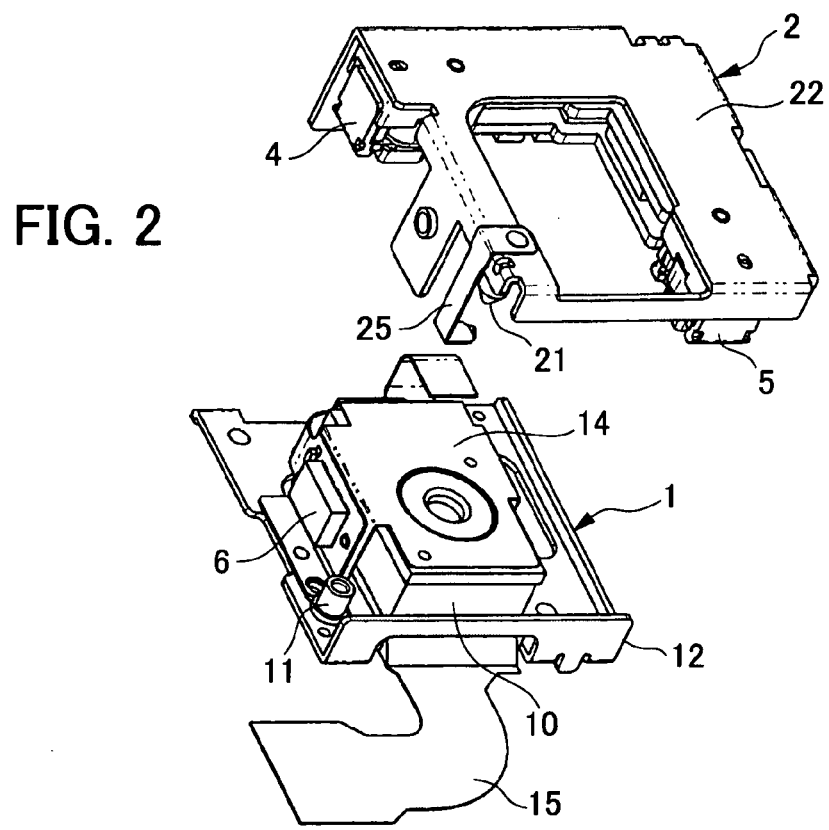
FIG. 2 is a perspective view of a way to assemble the first embodiment of the present invention.
Figure 3:
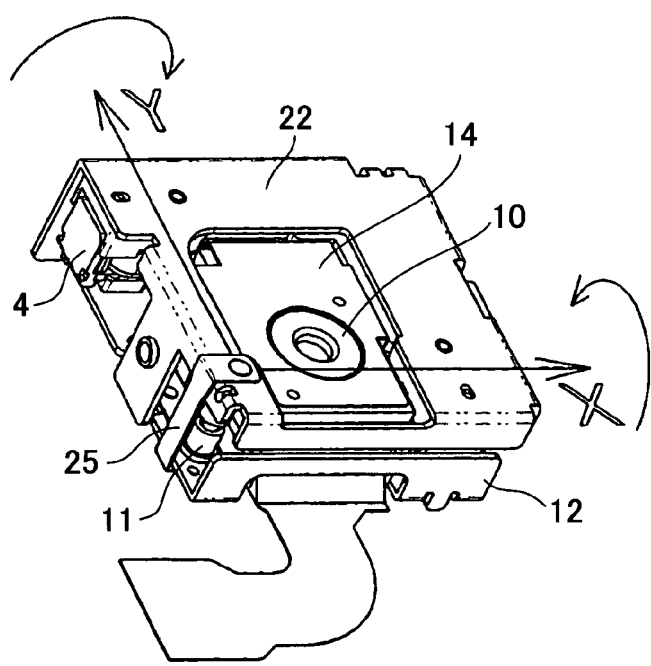
FIG. 3 is a perspective view showing operations of the first embodiment of the present invention.
Figure 4:
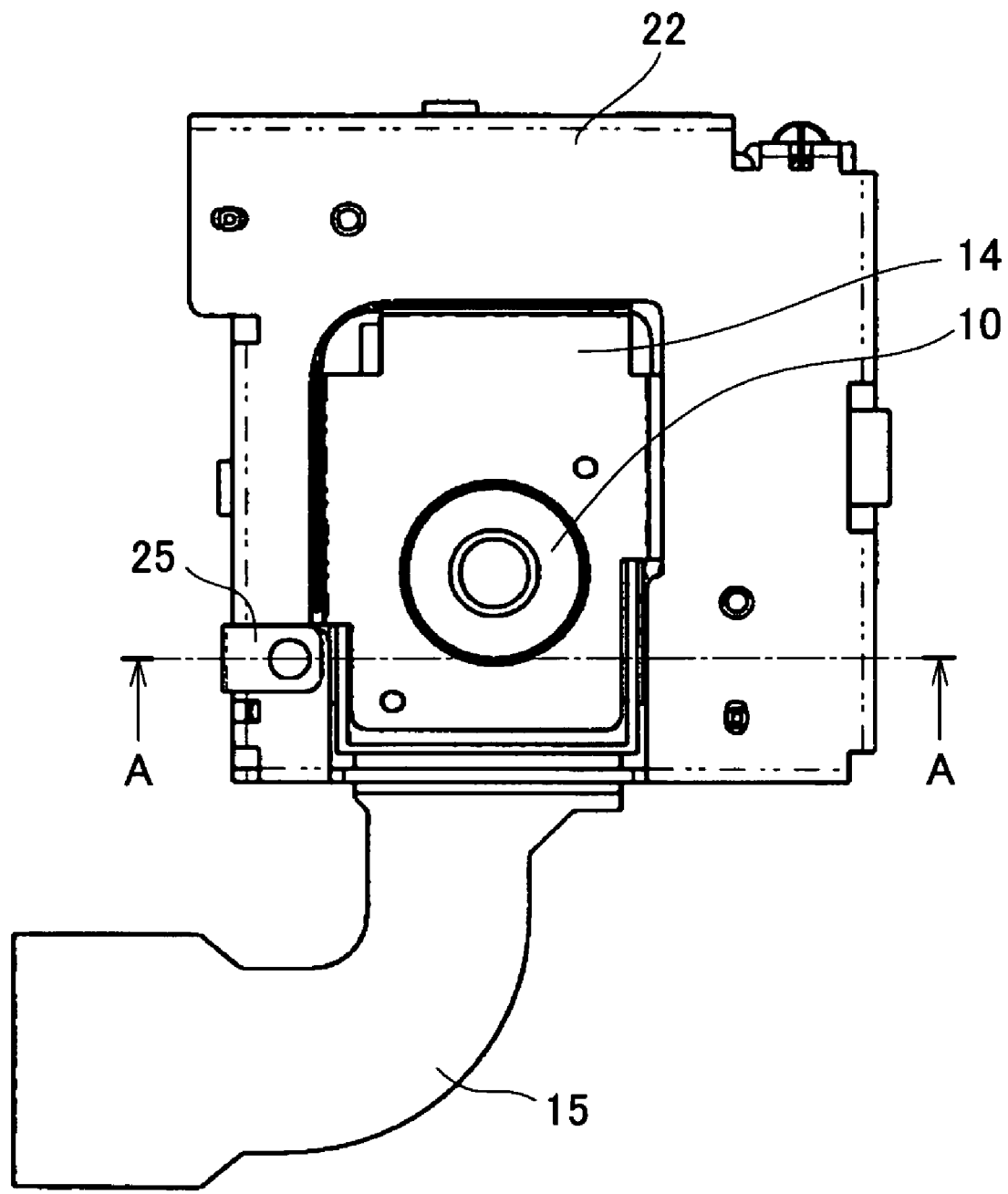
FIG. 4 is a front view of the first embodiment of the present invention.
Figure 5A:
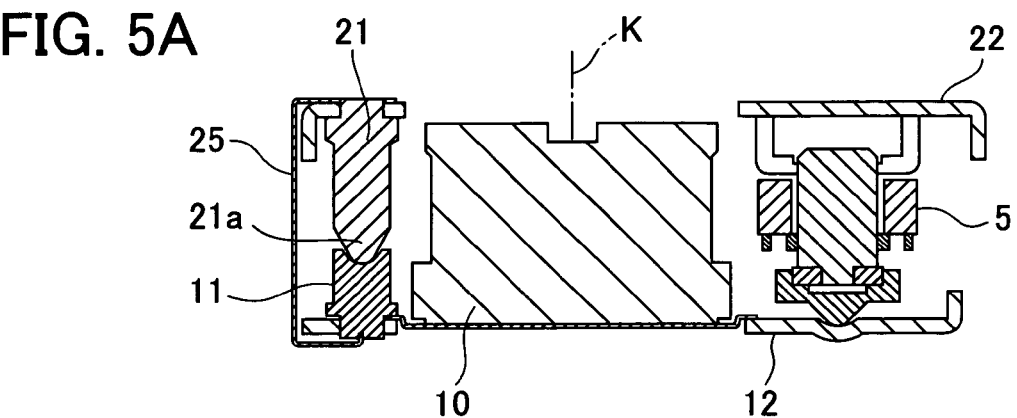
FIGS. 5A, 5B and 5C are side views illustrating operations of the first embodiment of the present invention.
Figure 5B:
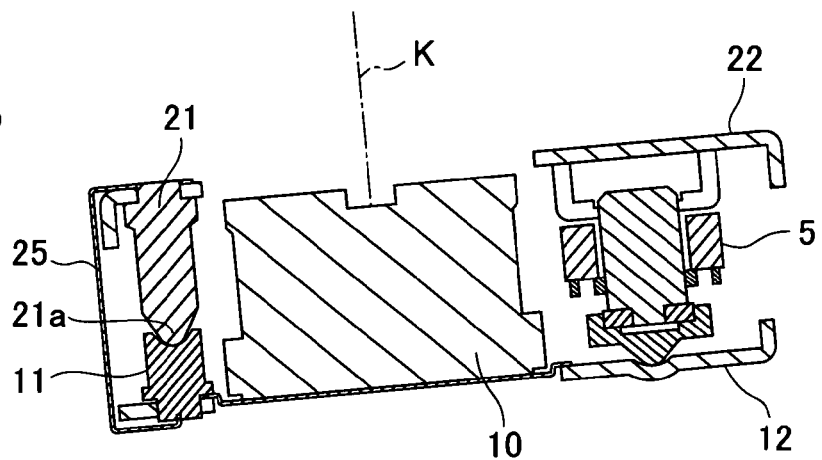
Figure 5C:
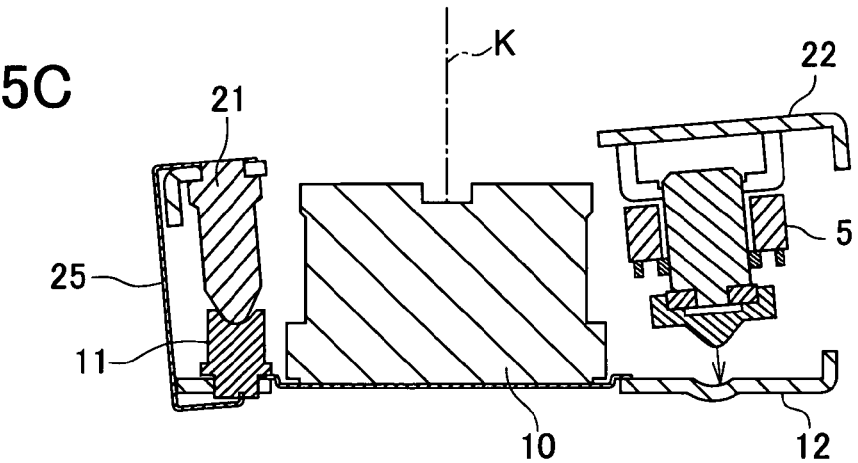

FIGS. 1 to 5C show a first embodiment of shake reduction apparatus according to the present invention of which FIG. 1 is an exploded perspective view thereof, FIG. 2 is a perspective view on the way to assembly, FIG. 3 is a perspective view, FIG. 4 is a front view, and FIG. 5A to FIG. 5C are cross-sectional views thereof respectively showing operations of correcting blurring induced by hand shake.

A camera to which the first embodiment of the invention is applied is a digital camera, and includes a movable-side unit 1, a stationary-side unit 2, linear actuators 4 and 5, movement detection unit 6 and 7, and a controller.

The movable-side unit 1 is provided with a camera unit 10, a movable-side shaft 11, and a movable-side frame 12 provided with them. The movable-side frame 12 is formed in a substantially rectangular shape in a plane view thereof.

The camera unit 10 is provided integrally with a lens and an image sensor (their illustrations are not shown) for forming an image. The image sensor is disposed in an imaging position on an optical axis of the lens. The image sensor is a device for converting an optical image from the lens into an image signal. A CCD, a CMOS or the like is used for the image sensor. Such a structure in that the camera unit 10 integrally has the lens and the image sensor causes the lens and image sensor to move in a unified manner together with the camera unit 10 when the camera unit 10 moves, so that the positions of the lens and the image sensor with respect to the camera unit 10 and a relative position of the lens and image sensor do not change.

As shown in FIG. 1, the camera unit 10 is fixed by being sandwiched between a lower frame 13 and an upper frame 14. Then, the lower frame 13 is fixed on the movable-side frame 12 by screw fixation, a welding connection or the like so that the camera unit 10 is attached to the movable-side frame 12. A Flexible Printed Circuit (FPC) 15 for electrical connection leads out of the camera unit 10.

The movable-side shaft 11 is provided at one corner of four corners of the movable-side frame 12. The movable-side shaft 11 is provided to stand up from the movable-side frame 12, an extremity portion thereof having a concave spherical surface 11a formed thereon. The movable-side shaft 11 meets a stationary-side shaft 21 in the stationary-side unit 2, described later.

The stationary-side unit 2 has a stationary-side frame 22 having substantially the same shape as the movable-side frame 12, and the stationary-side frame 22 is provided with a stationary-side shaft 21. The stationary-side shaft 21 is provided in an standing-up form at one corner meeting the movable-side shaft 11, having an extremity portion with a spherical protrusion 21a formed thereon. Since both the extremity portions of the stationary-side shaft 21 and the movable-side shaft 11 form spherical surfaces, the spherical surfaces come into contact with each other when the movable-side frame 12 is built onto the stationary-side frame 22. In this way, the movable-side frame 12 (movable-side unit 1) can move(tilt) with respect to the stationary-side frame 22, as shown in FIG. 5A to FIG. 5C. It should be noted that a control board 23 is disposed on a face on the movable-side frame 12 side in the stationary-side frame 22.

The movement detection unit 6 and 7 including a gyrosensor 6 for the X-axis and a gyrosensor 7 for the Y-axis are means for detecting the movement of the camera in two orthogonal axial directions of an X-axis and a Y-axis (see FIG. 3). These gyrosensors 6 and 7 are mounted on an FPC 24 for a gyrosensor. The gyrosensor-directed FPC 24 is attached to side faces of the upper frame 14 with the substantially perpendicularly bending form thereof in such a manner that the gyrosensors 6 and 7 take orthogonal positions. More specifically, the gyrosensors 6 is arranged in parallel with the X-axis and the gyrosensors 7 is arranged in parallel with the Y-axis. The X-axis and Y-axis intersect on a shaft formed by the movable-side shaft 11 and the stationary-side shaft 21. According to this arrangement, the gyrosensors 6 and 7 are located on the orthogonal side faces of the camera unit 10 for detecting the movement of the camera unit 10 (namely, the camera) about the two orthogonal axes.

The linear actuators 4 and 5 consist of a linear actuator 4 for rotation about the X-axis and a linear actuator 5 for rotation about the Y-axis. These linear actuators 4 and 5 are arranged on the X-axis and on the Y-axis, respectively. Accordingly, the linear actuators 4 and 5 are located on the two orthogonal axes. In addition, the linear actuators 4 and 5 are fixed to a face of the stationary-side frame 22 opposed to the movable-side frame 12, and disposed between the stationary-side frame 22 and the movable-side frame 12.

Both the linear actuators 4 and 5 are arranged in such a manner that their movable parts influence the movable-side frame 12, and make actuation so as to press the corresponding positions of the movable-side frame 12 based on expanding actuation and/or retracting actuation of their movable parts and allow this pressing to cause the movable-side frame 12 (that is, the movable-side unit 1) to move. It should be noted that the linear actuators 4 and 5 may be fixed to, for example, a face of the movable-side frame 12 opposed to the stationary-side frame 22 as far as the linear actuators 4 and 5 are disposed between the stationary-side frame 22 and the movable-side frame 12.

Figure 6:
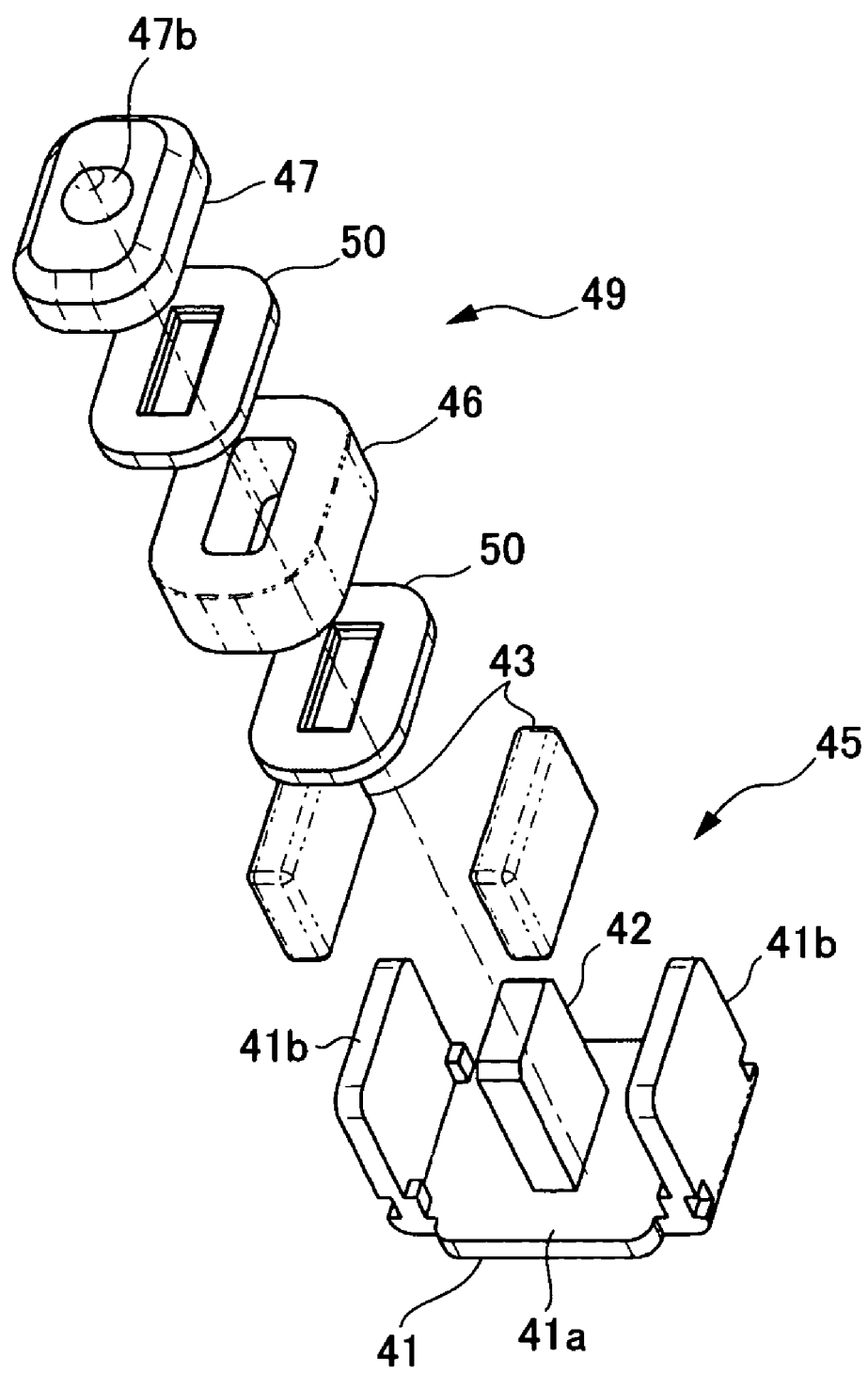
FIG. 6 is an exploded perspective view showing a linear actuator applicable to the present invention.
Figure 7A:
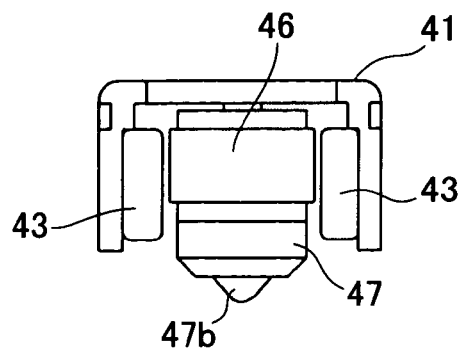
FIGS. 7A, 7B and 7C are a front view, a bottom view and a right side view of the linear actuator applicable to the present invention, respectively.
Figure 7B:
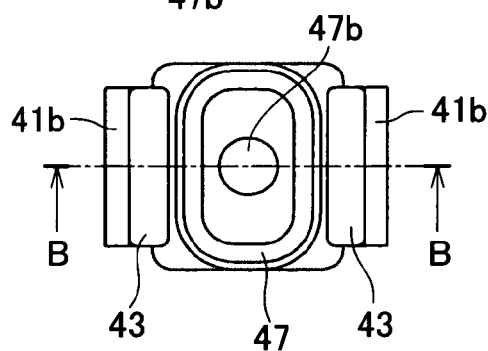
Figure 7C:
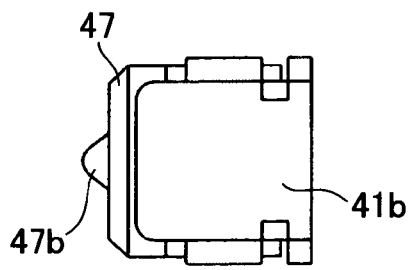
Figure 8:
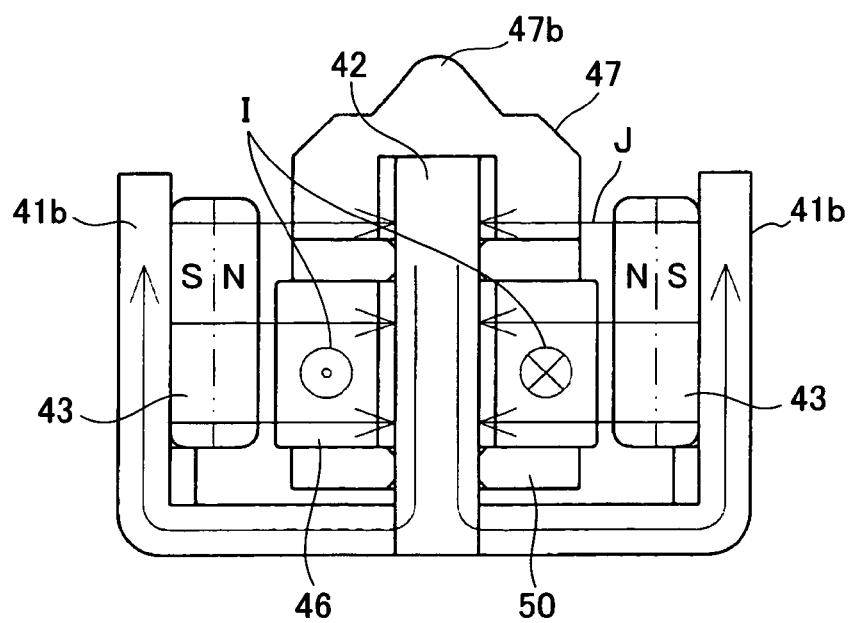
FIG. 8 is a cross-sectional view showing a relation between a magnetic field and a current in the linear actuator applicable to the present invention.
Figure 9A:
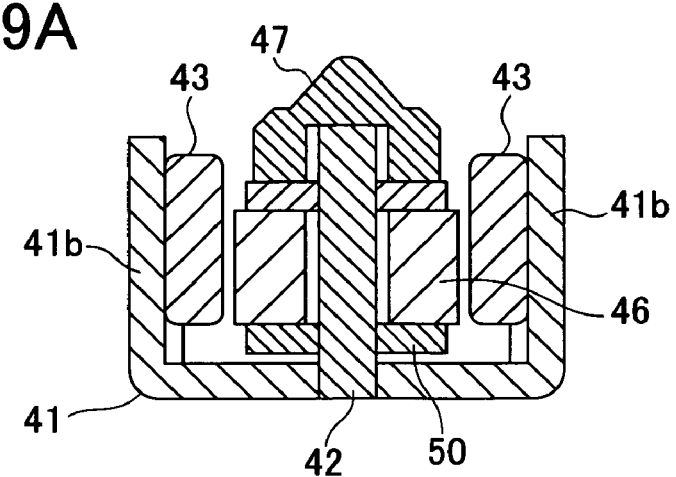
FIGS. 9A, 9B, and 9C are cross-sectional views taken along a line B-B of FIG. 7B, showing operations of the linear actuator applicable to the present invention.
Figure 9B:
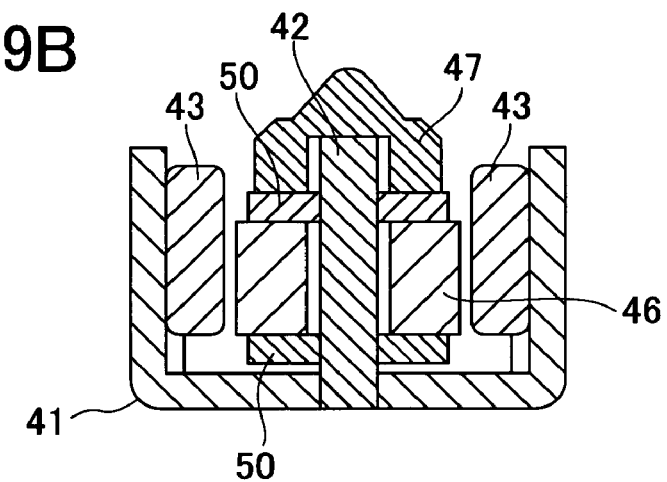
Figure 9C:
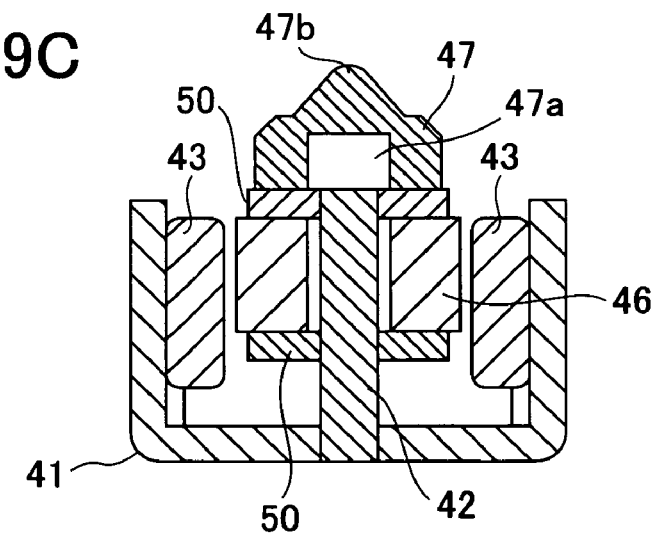

FIGS. 6 to 9C show a linear actuator that is used in a preferred embodiment of the present invention, of which FIG. 6 is an exploded perspective view, FIGS. 7a to 7c are assembly diagrams, FIG. 8 is an explanatory diagram for operation, and FIGS. 9A to 9C are cross-sectional views thereof taken along a line B-B of FIG. 7B, showing the operation.

As shown in FIG. 6, the linear actuator has a stationary section 45 formed of a side yoke 41, a center yoke 42 and two magnets 43, and a movable section 49 formed of a coil 46 and a cap 47.

The side yoke 41 of the stationary section 45 comprises a base piece 41a formed in a flat plane and two convex pieces 41b provided to stand up from both the left and right sides of the base piece 41a. The magnets 43 are attached to the respective opposite faces of the convex pieces 41b in the side yoke 41 as shown in FIG. 9A. Each of the magnets 43 is provided to have the north pole thereof located inside and the south pole thereof located outside (on the side of the convex piece 41b) as shown in FIG. 8.

The center yoke 42 is disposed between the two convex pieces 41b in the form of standing up from the base piece 41a of the side yoke 41. In this way, the center yoke 42 is inserted between the two magnets 43. In this case, the center yoke 42 penetrates through a center portion of the base piece 41a of the side yoke 41, comes into contact with the base piece 41a, and is supported by the side yoke 41. The center yoke 42 and the side yoke 41 are preferably made to have a high saturation magnetic flux density, and to this end, a ferromagnetic material is used for them.

An air-core coil formed in a cylindrical shape is used for the coil 46. The center yoke 42 penetrates through the coil 46. Guides 50 are provided on the above and below of the coil 46. The guides 50 are used to support the coil 46 by sandwiching the coil 46 from the above and below of the coil 46, and being fixed to the coil 46 by way of gluing or the like. The linear actuator of such a construction adopts a voice coil configuration.

The cap 47 is fixed on the coil 46. More specifically, the cap 47 is fixed to the guide 50 above the coil 46 by way of gluing or the like. The cap 47 takes substantially the same shape as that of the outer periphery of the coil 46. In addition, on a bottom of the cap 47, there is formed a concave portion 47a into which the center yoke 42 can be placed.

A protrusion 47b is formed on an upper surface of the cap 47. The protrusion 47b protrudes from the upper surface of the cap 47 having the form of a sphere. The protrusion 47b is intended to come into abutting contact with the movable-side frame 12, and its spherically protruding ensures that protrusion 47b can be held in satisfactory abutting contact with the movable-side frame 12. Thus, it is possible to securely transfer the operation of the linear actuator to the movable-side frame 12. In this case, the movable-side frame 12 preferably has a receiving section formed in a concave sphere into which the spherical protrusion 47b is placed. As the receiving section takes the form of a concave sphere, the spherical protrusion makes secure engagement with it without becoming disengaged therefrom. For the abovementioned cap 47 and guide 50, a light weight material such as plastic is preferably used, whereby reduction in weight of the movable section 49 can be achieved.

In the linear actuator of the present embodiment, the center yoke 42 is made to penetrate into the guides 50 and the coil 46, and a tip portion of the center yoke 42 is inserted into the concave portion 47a of the cap 47 so that the movable section 49 is built onto the stationary section 45. Since the center yoke 42 can penetrate through the coil 46 and the guides 50, the center yoke 42 serves as a guide when the movable section 49 moves rectilinearly, so that the rectilinear movement of the movable section 49 can be secured with high accuracy.

FIG. 8 shows a relation between a magnetic flux and a current caused when the linear actuator is expanded.

The two magnets 43 cause flow of the magnetic flux shown by an arrow J to occur in the center yoke 42 and the side yoke 41. The coil 46 is disposed in this magnetic field. In this situation, a current I is supplied to the coil 46. The current I is moves along a flowing direction rightward from the left side (a counterclockwise direction as FIG. 8 is viewed from above), and the supply of this current I exerts an upward force on the coil 46. In this way, the movable section 49 having the coil 46, guides 50 and cap 47 moves rectilinearly upward along the center yoke 42 as shown in FIG. 9C. This movement can apply pressure on the movable-side frame 12. On the other hand, a reverse-directional supply of the current I induces a downward force so that the movable section 49 moves rectilinearly downward as shown in FIG. 9B.

Since such a linear actuator has a voice coil construction, it is possible to realize a simple construction and miniaturization, and the control also becomes easy. In addition, since the stationary section 45 and the movable section 49 are assembled into one unit, this configuration has a high general versatility and is more suitable for mass production.

Next, description is provided regarding a procedure for attaching the movable-side unit 1 to the stationary-side unit 2.

As shown in FIG. 2, the linear actuators 4 and 5 are attached to the stationary-side frame 22. On the other hand, the gyrosensors 6 and 7 are placed for the lower frame 13 and the upper frame 14, and the camera unit 10 is made to be sandwiched between the lower frame 13 and the upper frame 14, and then the resulting assembly is mounted on to the movable-side frame 12. In this case, an assembly clasp 25 consisting of a laterally-facing U-shaped leaf spring is attached to the stationary-side frame 22. The clasp 25 is provided to one corner portion on a side on which a shaft constituted by the movable-side shaft 11 and the stationary-side shaft 21 is disposed. On the occasion of assembling, the movable-side unit 1 is made to come into abutting contact with the stationary-side unit 2, and the assembly clasp 25 is made to bridge over the movable-side frame 12.

On the occasion of assembling, a biasing member 9 is set as being made a bridge between the stationary-side frame 22 and the movable-side frame 12 (see FIG. 1). The biasing member 9 is constituted by, for example, an elastic material such as a compression coil spring, and is disposed at a corner portion opposed to the assembly clasp 25 so as to induce a bias such that the movable-side frame 12 moves toward the stationary-side frame 22. In other words, the biasing member 9 biases the movable-side frame 12 to close the movable-side frame 12 (in a direction in which the frame 12 approaches the stationary-side frame 22) on a side opposed to the side where the assembly clasp 25 is provided.

By providing such a biasing member 9, the linear actuators 4 and 5 are allowed only to drive the movable-side frame 12 in an open direction (a direction in which the frame 12 moves away from the stationary-side frame 22), thus simplifying an electrical circuit for supplying electric current to the linear actuators 4 and 5, etc., and enabling miniaturization. Moreover, there is a benefit in that the linear actuators 4 and 5 are easy to control.

When the X-axis gyrosensor 6 and the Y-axis gyrosensor 7 detect movement of the camera, the controller is adapted to control the linear actuator 4 for movement about the X-axis and the linear actuator 5 for movement about the Y-axis to cause the movable-side unit 1 to move so as to cancel the movement of the camera. By this movement, it is possible to reduce the blurring induced by hand shake.

With reference to FIGS. 5A to 5C, a description is provided regarding correction of blurring induced by hand shake in accordance with the present embodiment.

FIGS. 5A to 5C are cross-sectional views taken along a line A-A of FIG. 4, for explaining a case where movement induced by hand shake occurs about a Y-axis. FIG. 5A shows a situation immediately after an aperture is opened with a release button (not shown) being pressed down. In the situation shown in FIG. 5A, if the camera is tilted, then the movement induced by hand shake occurs because the optical axis K is inclined as shown in FIG. 5B. The Y-axis gyrosensor 7 detects an angular velocity in this inclination of the camera and outputs it to the controller. The controller is adapted to control and drive linear actuator 5 for the Y-axis rotation to cause the movable-side unit 1 (movable-side frame 12) to rotate about the Y-axis with a supporting point constituted by the movable-side shaft 11 and the stationary-side shaft 21, so as to counter the movement of the movable-side unit 1. In this way, the camera unit 10 mounted on the movable-side unit 1 rotates about the Y-axis, and thereby the lens and the sensor unit rotate in a unified manner so as to cancel the movement. By so doing, the optical axis K can be maintained in parallel with the Y-axis and the blurring induced by hand shake can be corrected.

The case of rotation about the Y-axis has been described with reference to FIGS. 5A to 5C. In the case of rotation about the X-axis, the gyrosensor 6 for the X-axis and the linear actuator 5 for X-axis rotation work to correct the blurring induced by hand shake. Additionally, in a case of coupled rotation about the Y-axis and X-axis, the X-axis gyrosensor 6 and the linear actuator 4 for X-axis rotation, and the Y-axis gyrosensor 7 and the linear actuator 5 for Y-axis rotation work to correct for the blurring induced by hand shake.

In the present embodiment, since the lens and image sensor integrally move to perform correction of the burring induced by hand shake, there is no occurrence of optical deterioration, for example, caused in the lens-shift shake reduction technique, nor occurrence of adverse influences on machine accuracy, for example, caused in the sensor-shift shake reduction technique. In addition, the only sensors used are the gyrosensors 6 and 7 for detecting movement of the camera, thus making it possible to reduce the number of sensors, and the X-axis gyrosensor 6 is independent from the linear actuator 4 for X-axis rotation and the Y-axis gyrosensor 7 is independent from the linear actuator 5 for Y-axis rotation, thereby facilitating the control. Moreover, since there is adopted a foundational control such that the lens and the image sensor is made to integrally move for correction of the blurring induced by hand shake, general versatility is expanded and efficiency of mass production is improved, even in a case where the specification of the lens and the image sensor are changed.

In addition, since the biasing member 9 is provided to bias the movable-side frame 12 to move toward the stationary-side frame 22, the linear actuator 4 for X-axis rotation and the linear actuator 5 for Y-axis rotation are allowed only to be driven uni-directionally. Thus simplification of the electrical circuit, size reduction thereof, and easy control of the linear actuators 4 and 5 are achieved.

Second Embodiment

Figure 10:
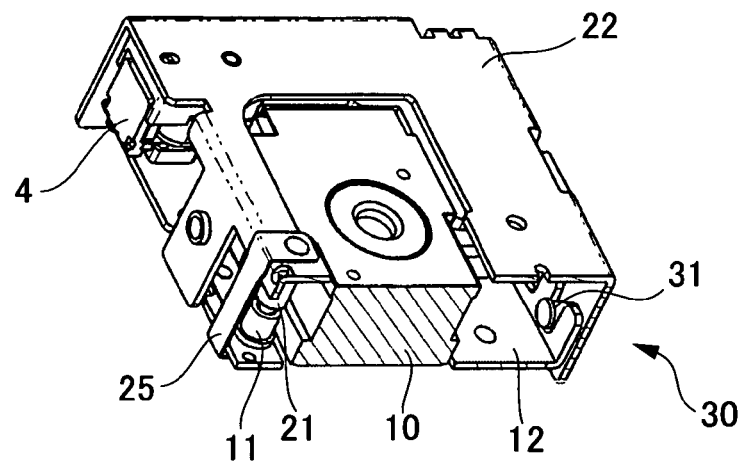
FIG. 10 is an exploded perspective view showing a second embodiment of a shake reduction apparatus according to the present invention.
Figure 11:
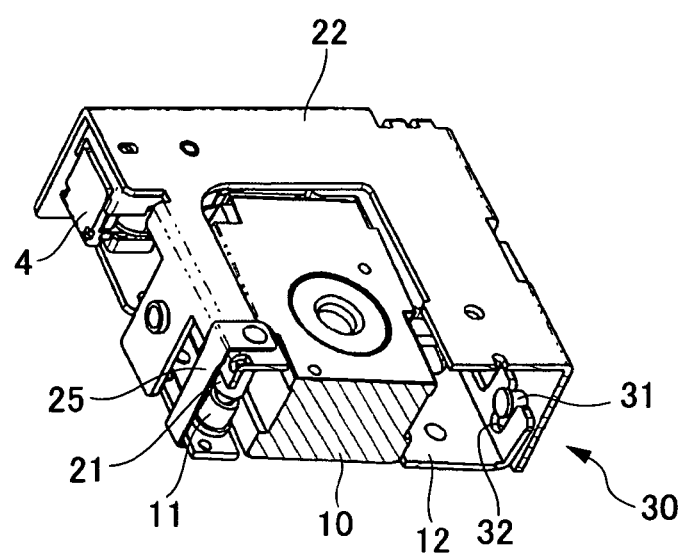
FIG. 11 is a perspective view showing operations of the second embodiment of the present invention.
Figure 12:
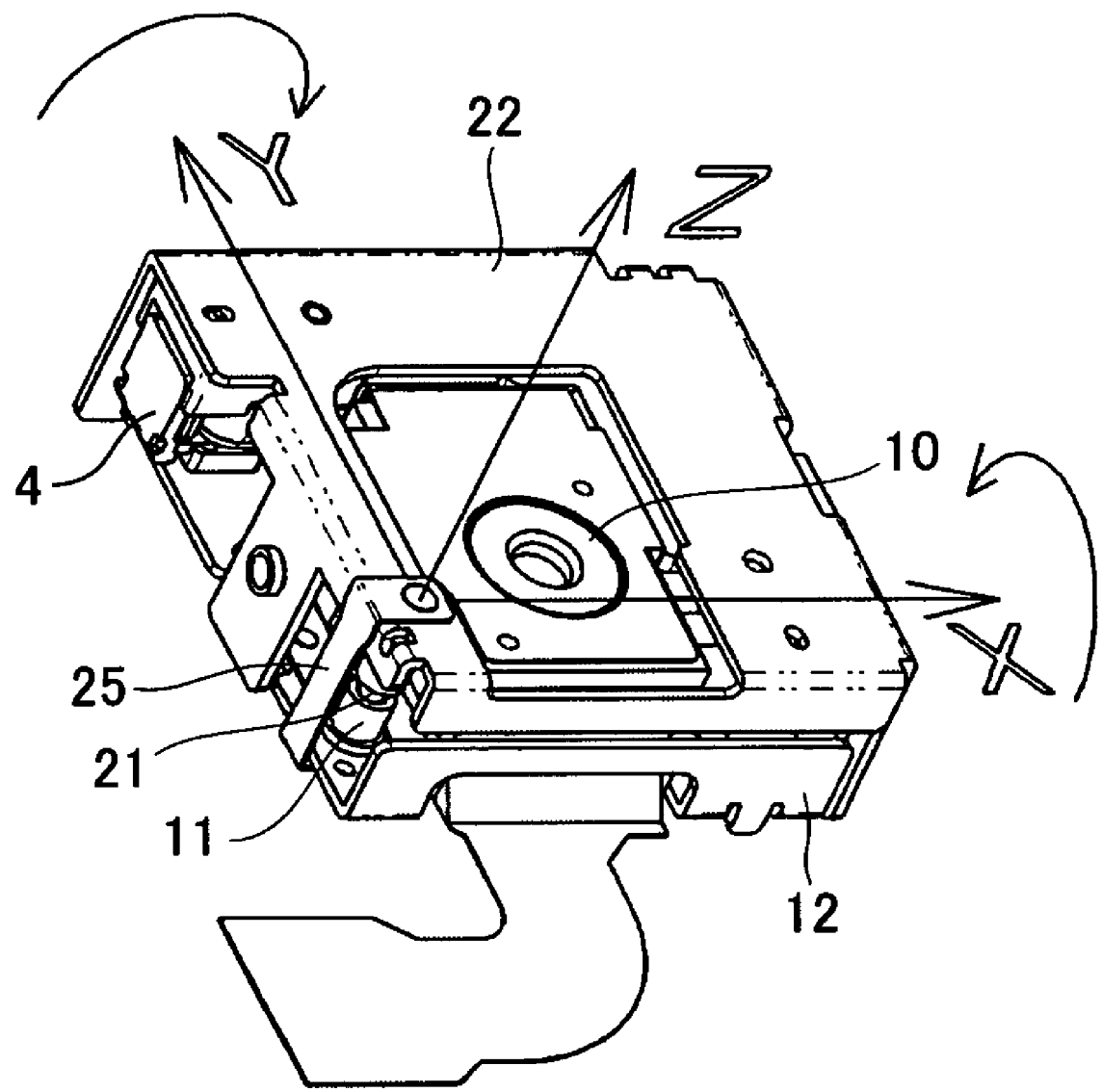
FIG. 12 is a perspective view explaining the second embodiment of the present invention.

FIGS. 10 to 12 show a second embodiment of a shake reduction apparatus according to the present invention.

The present embodiment is intended to provide a rotation regulating member 30 including a pin section 31 and a groove 32. The rotation regulating member 30 regulates such that the movable-side frame 12 rotates only about the X-axis and the Y-axis that are two orthogonal axes, as shown in FIG. 12. Accordingly, the rotation regulating member 30 prevents the movable-side frame 12 from rotating about a Z-axis other than the X-axis and Y-axis, thus working to enable more accurate correction of the blurring induced by hand shake.

A pin section 31 in the rotation regulating member 30 is mounted on the stationary-side frame 22, and the groove 32 therein is formed on the movable-side frame 12. The pin section 31 extends inward from an inner surface of the stationary-side frame 22 in parallel with the X-axis and on the X-axis. The pin section 31 is located at substantially the same height as a contact surface on which the movable-side rotary shaft 11 and the stationary-side rotary shaft 21 come in contact. The pin section 31 is inserted into the groove 32. The groove 32 prevents the inserted pin section 31 from moving in the Y-axis.

On the occasion of putting the movable-side unit 1 into the stationary-side unit 2, the pin section 31 is inserted into the groove 32, and the pin section 31 and the groove 32 are engaged with each other. When the movable-side unit 1 rotates about the X-axis in this situation, the movable-side unit 1 rotates with respect to the pin section 31. On the other hand, when the movable-side unit 1 rotates about the Y-axis, the movable-side unit 1 moves upward or downward along the groove 32 using the pin section 31 as a guide. Accordingly, the pin section 31 and groove 32 engaged with each other enable rotation of the movable-side unit 1 to be limited only to directions in which the X-axis gyrosensor 6 and the Y-axis gyrosensor 7 are operable for their detection, so that more accurate correction of the blurring induced by hand shake can be achieved.

Figure 13:
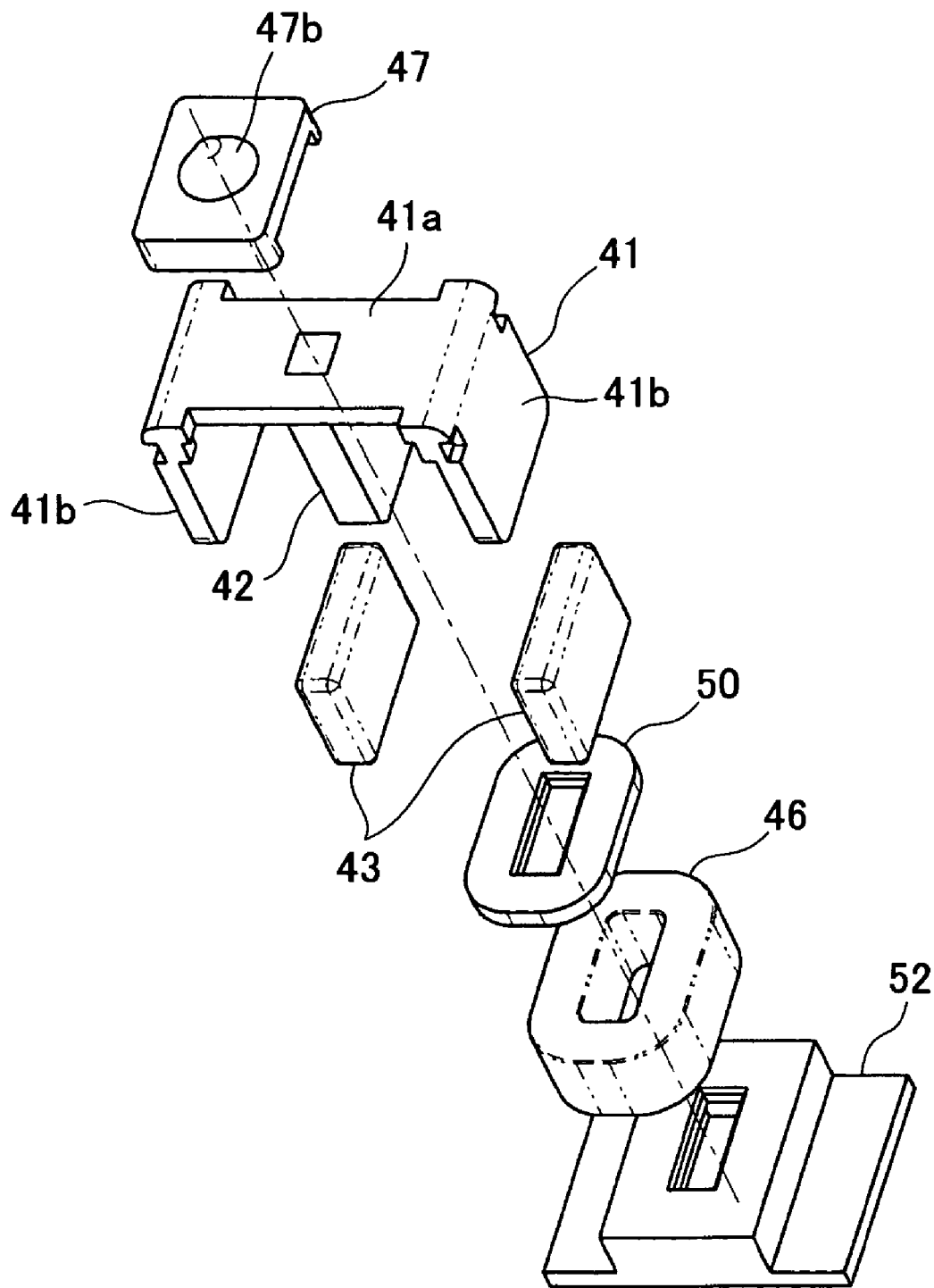
FIG. 13 is an exploded perspective view showing a modification of a linear actuator applicable to the invention.
Figure 16A:
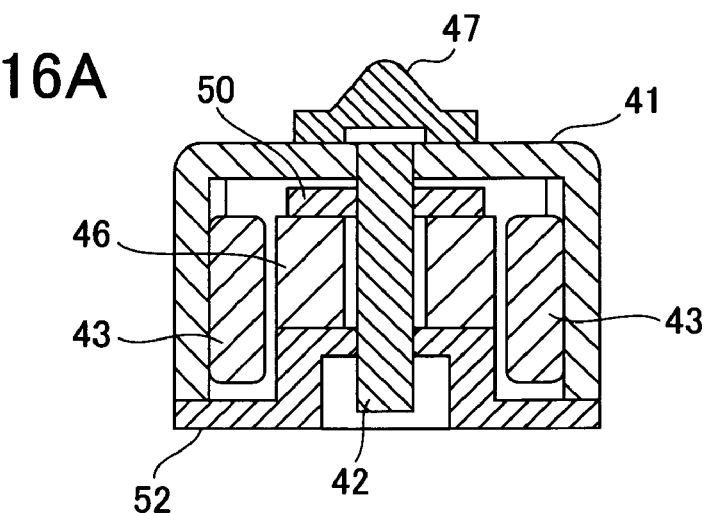
FIGS. 16A, 16B and 16C are cross-sectional views taken along a line C-C of FIG. 14B, showing operations of the modification of the linear actuator applicable to the present invention.
Figure 16B:
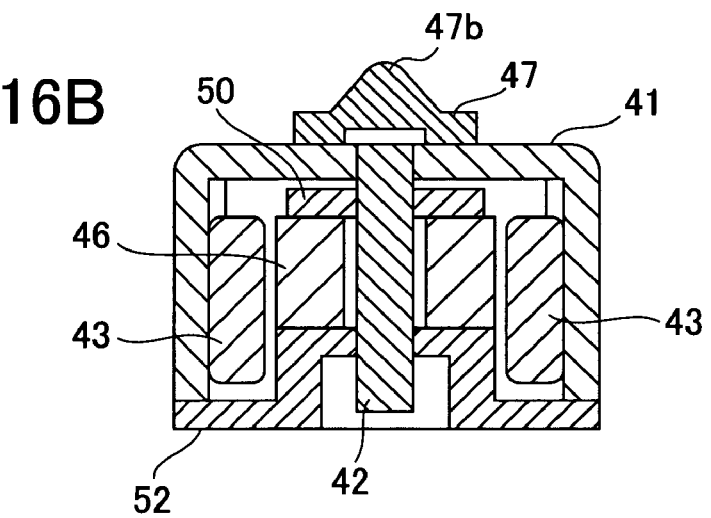
Figure 16C:
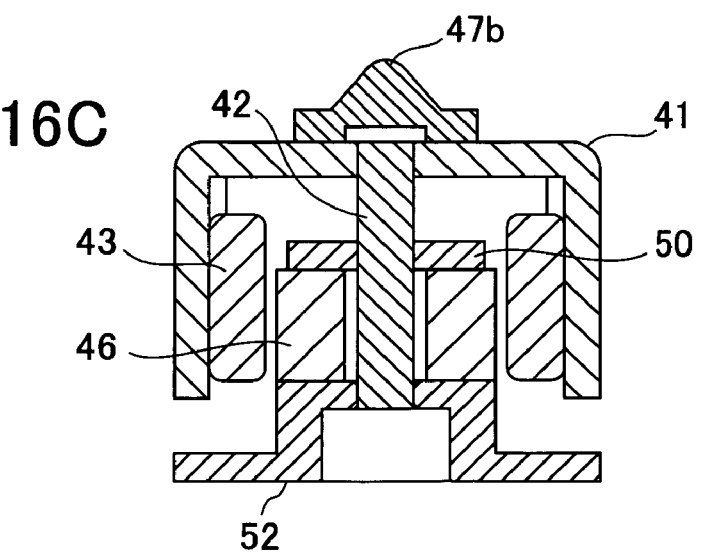

FIGS. 13 to 16C show a modification of a linear actuator that is applicable to the present invention, of which FIG. 13 is a exploded perspective view, FIGS. 14A to 14C are assembly diagrams, FIG. 15 is an explanatory diagram for operation and FIGS. 16A to 16C are cross-sectional views thereof taken along a line C-C of FIG. 14B, and showing operations thereof.

In this modification, the stationary section 45 is formed by the coil 46 and the guide 50, and the movable section 49 is formed by the side yoke 41, the center yoke 42, the magnets 43 and the cap 47.

The coil 46 forming part of the stationary section 45 is fixed to a base 52. The guide 50 is fixed to the coil 46 by way of gluing or the like.

The side yoke 41 of the movable section 49 has a base piece 41a and two convex pieces 41b extending from both sides of the base piece 41a toward the coil 46. Two magnets 43 are attached to opposed surfaces of the convex pieces 41b. The center yoke 42 is disposed between the magnets 43 and then provided between the two convex pieces 41b. The cap 47 is fixed on an upper surface of the base piece 41a of the side yoke 41 and thus has an influence on the movable-side frame 12.

FIG. 15 shows operations of the linear actuator of the present embodiment, in which the magnetic field shown by an arrow J is created in the movable section 49. In this situation, a current I flowing from the right to the left is supplied to the coil 46. By doing so, a whole of the movable section 49 constituted by the side yoke 41, the magnets 43, the center yoke 42 and the cap 47 moves rectilinearly upward as shown in FIG. 16C. The supply of current in a direction the reverse of the current I causes the entire of the movable section 49 to move rectilinearly downward. Since the center yoke 42 penetrates through the coil 46 for such upward and downward rectilinear movement, more accurate rectilinear movement can be realized.

In the present modification, the coil 46 can never move because the coil 46 is disposed to the stationary section 45. For this reason, any lead wire for supplying a current to the coil 46 can be made to be fixed for wiring. In other words, it is not necessary for the lead wire to be routed after taking into account the movement of the coil 46. Thus, mounting onto the shake reduction apparatus becomes easy, and the endurance is enhanced.

Although the embodiments of this invention have been described in detail with reference to the drawings, more specific construction thereof is not limited to the embodiments, and includes designs and so on within a scope without departing from the gist of the invention.

What is claimed is:

1. A shake reduction apparatus, comprising:
    a movable-side unit having a movable-side frame provided with a camera unit including a lens and an image sensor, and a movable-side shaft having a spherical surface as an extremity surface thereof;
    a stationary-side unit having a stationary-side frame provided with a stationary-side shaft having an extremity formed as a spherical surface coming into contact with the extremity of the movable-side shaft, to which the movable-side unit is attached;
    linear actuators disposed between the movable-side frame and the stationary-side frame to drive the movable-side unit to rotate about two orthogonal axes;
    a movement detection unit for detecting a movement of the camera unit about the two orthogonal axes; and
    a controller for controlling the linear actuators to cause the movable-side unit to move so as to cancel the movement of the camera unit when the movement detection unit detects the movement of the camera unit;
    wherein each of the linear actuators comprises:
        a stationary section formed of (i) a side yoke having two convex pieces with magnets attached to opposed surfaces thereof and a base piece, said two convex pieces protruding from both sides of the base piece, and (ii) a center yoke disposed on the base piece of the side yoke, wherein the center yoke is situated between the two convex pieces; and a movable section comprising a coil formed in a cylindrical shape into which the center yoke penetrates and a cap mounted on an extremity portion of the coil.

2. The shake reduction apparatus according to claim 1, wherein the apparatus further comprises a biasing member which biases the movable-side frame toward the stationary-side frame and which forms a bridge between the movable-side frame and the stationary-side frame.

3. The shake reduction apparatus according to claim 1, wherein the apparatus further comprises:
rotation regulating means having a pin section and a groove which are held in engagement with each other to limit rotation of the movable-side frame to be only about the two orthogonal axes.

4. The shake reduction apparatus according to claim 3, wherein in the rotation regulating means, the pin section extends in an axial direction of one of the two orthogonal axes, and the groove extends in the other axial direction.

5. The shake reduction apparatus according to claim 1, wherein the cap has a protrusion section protruding with a spherical form.

6. A shake reduction apparatus, comprising:
a movable-side unit having a movable-side frame provided with a camera unit including a lens and an image sensor, and a movable-side shaft having a spherical surface as an extremity surface thereof;
a stationary-side unit having a stationary-side frame provided with a stationary-side shaft having an extremity formed as a spherical surface coming into contact with the extremity of the movable-side shaft, to which the movable-side unit is attached;
linear actuators disposed between the movable-side frame and the stationary-side frame to drive the movable-side unit to rotate about two orthogonal axes;
a movement detection unit for detecting a movement of the camera unit about the two orthogonal axes; and
a controller for controlling the linear actuators to cause the movable-side unit to move so as to cancel the movement of the camera unit when the movement detection unit detects the movement of the camera unit;
wherein each of the linear actuators comprises:
a movable section formed of (i) a side yoke having two convex pieces with magnets attached to opposed surfaces thereof and a base piece, said convex pieces protruding from both sides of the base piece, and (ii) a center yoke disposed on the base piece of the side yoke, and situated between the two convex pieces and a cap attached to an outer surface of the base piece of the side yoke; and
a stationary section comprising a coil formed in a cylindrical shape into which the center yoke penetrates and a base to support the coil.

7. The shake reduction apparatus according to claim 6, wherein the apparatus further comprises a biasing member which biases the movable-side frame toward the stationary-side frame and which forms a bridge between the movable-side frame and the stationary-side frame.

8. The shake reduction apparatus according to claim 6, wherein the apparatus further comprises:
rotation regulating means having a pin section and a groove which are held in engagement with each other to limit rotation of the movable-side frame to be only about the two orthogonal axes.

9. The shake reduction apparatus according to claim 8, wherein in the rotation regulating means, the pin section extends in an axial direction of one of the two orthogonal axes, and the groove extends in the other axial direction.

10. The linear actuator for use in a shake reduction apparatus according to claim 6, wherein the cap has a protrusion section protruding with a spherical form.

* * * * *